United States Patent [19]
Varga

[11] Patent Number: 6,087,817
[45] Date of Patent: Jul. 11, 2000

[54] CIRCUITS AND METHODS FOR DEVELOPING A REGULATED AUXILIARY OUTPUT WITH AN OVERWINDING ON A SYNCHRONOUS BUCK REGULATOR

[75] Inventor: Craig Varga, Mt. View, Calif.

[73] Assignee: Linear Technology Corp., Milpitas, Calif.

[21] Appl. No.: 09/395,804

[22] Filed: Sep. 14, 1999

[51] Int. Cl.[7] .................................................. G05F 1/40
[52] U.S. Cl. ........................ 323/282; 323/266; 323/267
[58] Field of Search ................................... 323/266, 267, 323/282

[56] References Cited

U.S. PATENT DOCUMENTS

| | | |
|---|---|---|
| 5,552,695 | 9/1996 | Schwartz . |
| 5,677,619 | 10/1997 | Doluca .................................. 323/282 |
| 5,886,508 | 3/1999 | Jutras .................................... 323/282 |

*Primary Examiner*—Edward H. Tso
*Assistant Examiner*—Gary L. Laxton
*Attorney, Agent, or Firm*—Fish & Neave; Robert W. Morris; Joel Weiss

[57] ABSTRACT

Circuits and methods for regulating an auxiliary output with an over-winding on a synchronous buck regulator are provided. Though these regulators have produced regulated auxiliary outputs in conventional circuits, the regulation used in conventional circuits has not been maximized. This caused the auxiliary output voltage to vary with changes in load on the primary output as well as with changes in load on the auxiliary output. The present invention directly regulates the auxiliary output voltage of the synchronous buck regulator by adjusting the gate amplitude of a MOSFET switch located in the power loop of the auxiliary output.

19 Claims, 5 Drawing Sheets

CIRCUITS AND METHODS FOR DEVELOPING A REGULATED AUXILIARY OUTPUT WITH AN OVERWINDING ON A SYNCHRONOUS BUCK REGULATOR

BACKGROUND OF THE INVENTION

This invention relates to regulating an auxiliary output voltage derived from a switching regulator. Specifically, this invention relates to providing a simple, efficient means of accurate regulation for an auxiliary output voltage derived from an over-winding on the primary "buck" inductor of a synchronous buck regulator.

One class of transformer-coupled switching regulators is the coupled-inductor buck converter. This class is identified in Schwartz U.S. Pat. No. 5,552,695 (hereinafter the "'695 patent"), which is hereby incorporated by reference in its entirety. Previously known coupled-inductor buck converters provide multiple regulated outputs by generating a primary output (e.g., 3.3 volts) using a buck converter and adding an auxiliary winding which operates as a coupled inductor for a secondary output (e.g., 5 volts). The basic over-wind topology is well understood in the art, and widely used.

FIG. 1 shows one example of this type of converter 100. In FIG. 1, the over-wind technique produces a crudely regulated auxiliary output voltage 106 capable of providing a voltage that is proportional to the main output voltage 104. The proportionality depends on the number of turns in the primary inductor 160 and secondary inductor 170.

When transistor 110 turns ON, energy builds up and is stored in the primary inductor 160 of the transformer. The phasing of the transformer is chosen so that the voltage produced in secondary inductor 170 at this time reverse biases the diode 130.

When transistor 110 shuts OFF, some of the energy stored in the primary inductor 160 is transferred to the secondary inductor 170. Transistor 120 turns ON substantially simultaneously to transistor 110 shutting OFF. At this point, the diode 130 is forward biased, and a current flows through the secondary inductor 170, thereby charging capacitor 140. A decrease in secondary current occurs with time, until the next cycle begins.

Basic voltage regulation in the circuit is accomplished by transmitting main output feedback 180 to PWM controller 102. After comparing the feedback from main output feedback 180 to a pre-determined voltage level, PWM controller 102 then adjusts the duty cycle of switches 110 and 120 as required.

Schwartz, in the '695 patent, teaches replacing diode 130 with a synchronous MOSFET switch 210, as shown in FIG. 2. Switch 210 (which could be placed alternatively between the inductor and the auxiliary output voltage) is driven synchronously with transistor 120. This modification significantly improves the efficiency of the circuit because of the significantly lower voltage drop of switch 210 when compared with diode 130.

While Schwartz's method offers an improvement in performance of the auxiliary output voltage 106, and the circuits described in the '695 patent works well, regulation accuracy of the auxiliary output voltage 106 has certain obstacles to overcome. A large percentage of the regulation errors in the auxiliary output 106 are caused by voltage drops which occur in the winding resistance (and core losses) of primary inductor 170. As load increases on the main output voltage 104, the voltage drop in primary inductor 160 increases because of the increased current flowing through the winding. Therefore, the auxiliary output voltage 106, which is proportional to the voltage across primary inductor 160, tends to vary directly with load on the main output voltage 104. There are also losses in secondary inductor 170 which increase as a function of load on auxiliary output voltage 106. As a result, auxiliary output voltage 106 varies inversely proportionally to its load.

A popular solution to the problem is to raise the nominal output voltage of the auxiliary output by a volt or two and add a linear regulator to the output. The obvious problems are a reduction in efficiency and the attendant thermal problem of cooling the linear regulator.

In view of the foregoing, it would be desirable to provide a voltage regulator having a primary output and at least one auxiliary output such that each auxiliary output is regulated independently of the regulation of the primary output.

It would also be desirable to provide a voltage regulator having a primary output and at least one auxiliary output such that each auxiliary output is regulated independently of changes to the load on the primary output.

It would also be desirable to provide a voltage regulator having a primary output and at least one auxiliary output such that each auxiliary output is regulated independently of changes to the load on the auxiliary output.

SUMMARY OF THE INVENTION

It is an object of the present invention to provide a voltage regulator having a primary output and at least one auxiliary output such that each auxiliary output is regulated independently of the regulation of the primary output.

It would also be desirable to provide a voltage regulator having a primary output and at least one auxiliary output such that each auxiliary output is regulated independently of changes to the load on the primary output.

It is another object of the present invention to provide a voltage regulator having a primary output and at least one auxiliary output such that each auxiliary output is regulated independently of changes to the load on the auxiliary output.

A switching regulator having a regulated main output voltage and at least one regulated auxiliary output voltage is provided. The switching regulator includes a switch, preferably a MOSFET switch, coupled in series with the auxiliary voltage. The switching regulator also includes a control circuit coupled to regulate the main voltage and coupled to regulate the ON and OFF time of the switch. Finally, a gate feedback circuit is coupled to the auxiliary voltage such that the gate feedback circuit modulates the ON-resistance of the switch as an inverse function of auxiliary voltage in order to regulate said auxiliary voltage.

The control circuit may be implemented as a PWM controller.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention is an extension of the idea developed by Schwartz in the 1695 patent. Though Schwartz' circuit works well, it does not provide for maximum regulation of the auxiliary output voltage.

By providing an adjustable gate drive to the gate of switch 210 capable of modulating the gate amplitude as a function of output voltage error, the regulation of the auxiliary output voltage can be radically improved. To illustrate this point, various cases in which the gate drive is driven at differing levels will be explored.

When the gate is not driven at all, i.e. the voltage at the gate is substantially zero volts, the MOSFET in switch 210 degenerates into a silicon junction diode with a forward voltage drop of approximately 0.7 volts to 0.8 volts. If, on the other hand, the MOSFET is driven with a normal gate drive and fully enhanced (i.e., the gate drive is high enough to force the MOSFET into its ohmic region), the forward drop on the switch drops to perhaps 0.05 volts to 0.1 volt. This voltage drop depends on the on-resistance of the specific MOSFET and the amplitude of the gate drive.

A typical logic level MOSFET is fully enhanced with approximately 5 volts on the gate. This implies that, with full gate drive to the MOSFET, the output voltage will be approximately 600 millivolts to 750 millivolt higher than if the gate is not driven at all. If the gate drive supply voltage is adjusted to a point between threshold (i.e., just enough gate drive to allow the MOSFET to conduct) and full enhancement, the output voltage may now be adjusted over this 600 millivolt to 750 millivolt range, or about ±350 millivolt around some nominal voltage. This range adds a layer of highly efficient regulation to the auxiliary output voltage.

Figure 1:
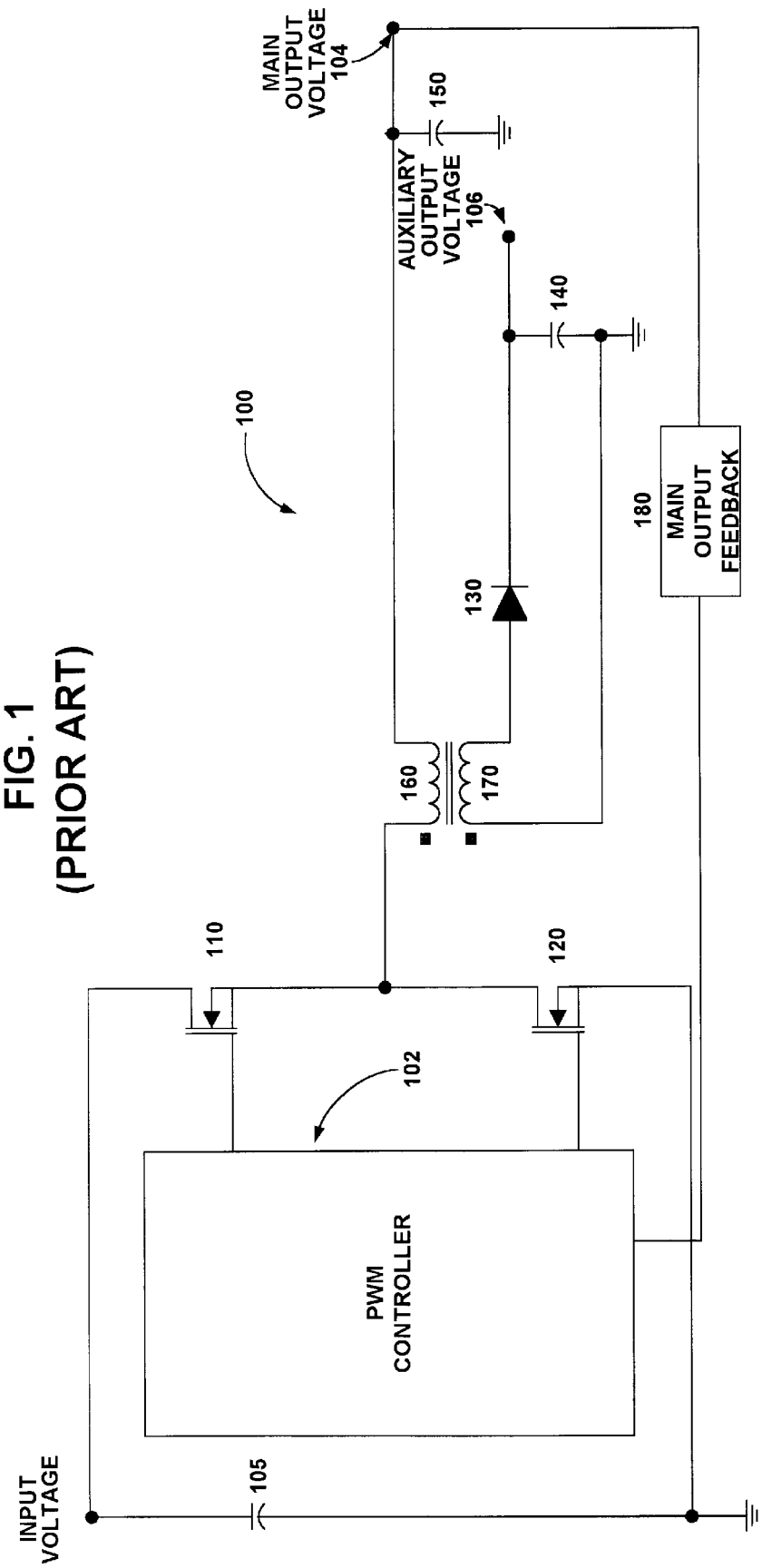
FIG. 1 is a block diagram of a conventional buck/overwind converter.
Figure 2:
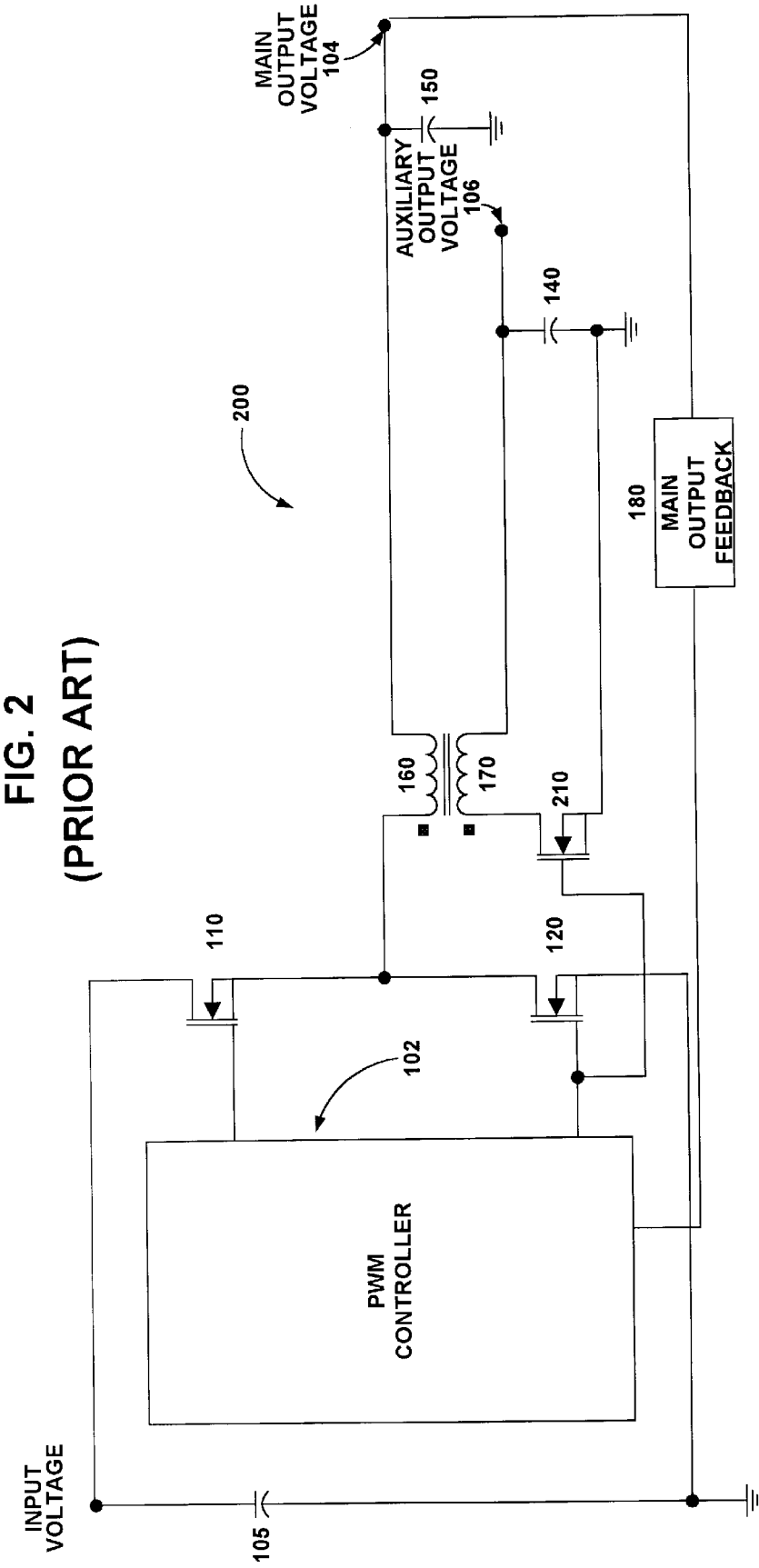
FIG. 2 is a block diagram of a conventional buck/overwind converter incorporating a third switch in the auxiliary power loop.
Figure 3:
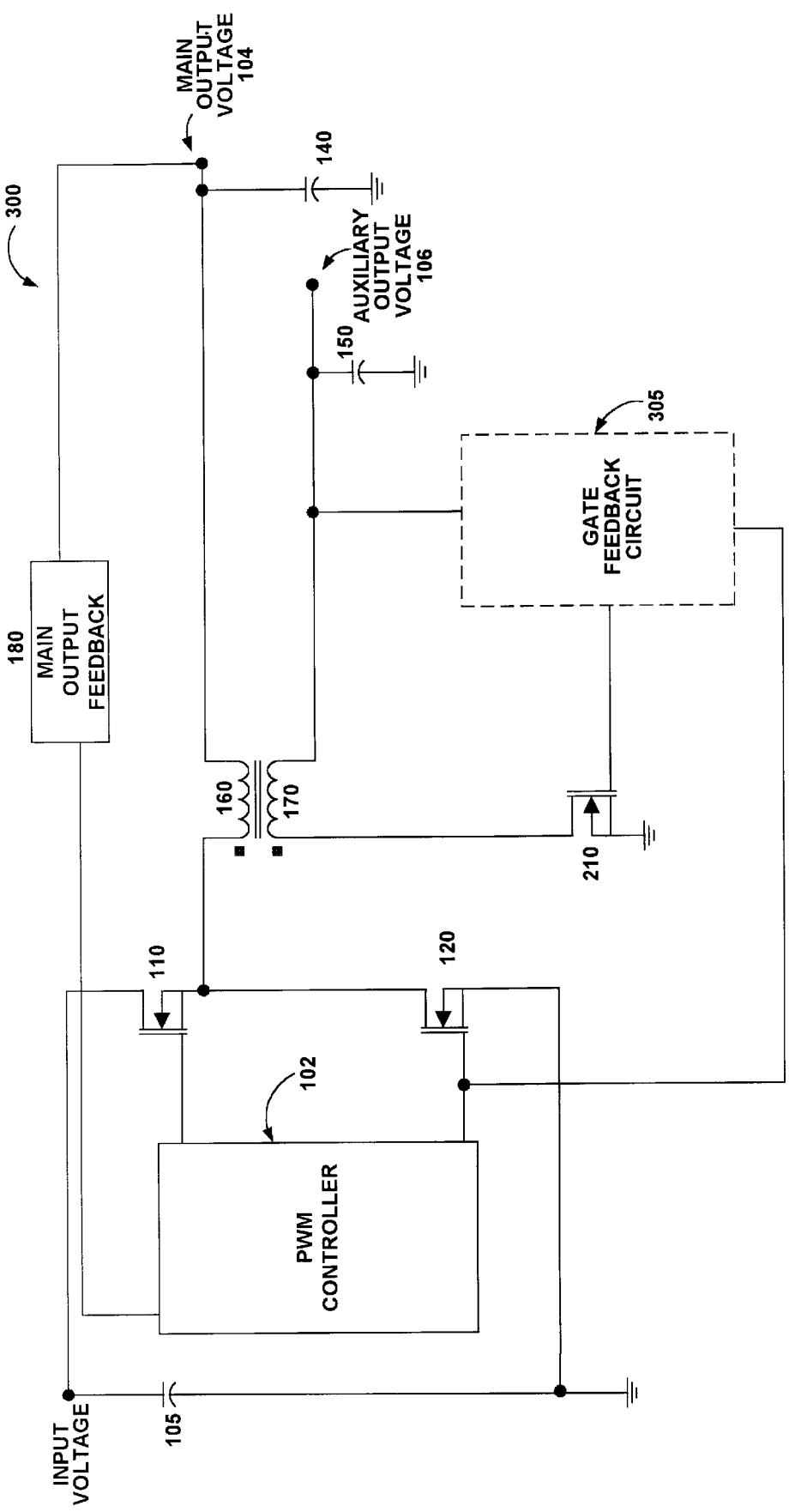
FIG. 3 is a block diagram of a buck/overwind converter according to the principles of the invention.

The coupled-inductor buck converter 300 shown in FIG. 3 illustrates one possible realization of this concept. The main difference between the circuit shown in FIG. 2 and the circuit shown in FIG. 3 is that a feedback loop has been added to regulate the amplitude of the gate drive to switch 210. Like circuit 200 shown in FIG. 2, the coupled-inductor buck converter 300 is also composed of three switches (transistors 110, 120, and 210), a PWM controller 102 for controlling operation of the switches such that when transistor 110 is closed, transistor 120 and transistor 210 are open, and an inductor having a primary inductor 160 and a secondary inductor 170. In addition, a gate feedback circuit 305 is provided in coupled-inductor buck converter 300 for adjusting the gate drive to switch 210.

Converter 300 produces a regulated primary output voltage and a regulated auxiliary output voltage from an input voltage. The main output voltage is fed back to the PWM controller 102 through a main output feedback 180. PWM controller 102 uses the main output feedback 180 to regulate the timing of the three switches. Though it is not required for operation of the circuit, continuous inductor current during all operations is assumed.

To directly regulate the auxiliary output voltage, gate feedback circuit 305 utilizes a feedback signal from the auxiliary output to adjust the gate drive to switch 210, and thereby to vary the drain-source ON-resistance of switch 210. Regulation of gate drive to switch 210 adjusts the amount of current passing through switch 210 when it is ON. This, in turn, adjusts the voltage supplied to the auxiliary voltage output and thereby directly regulates the auxiliary voltage output.

Figure 4:
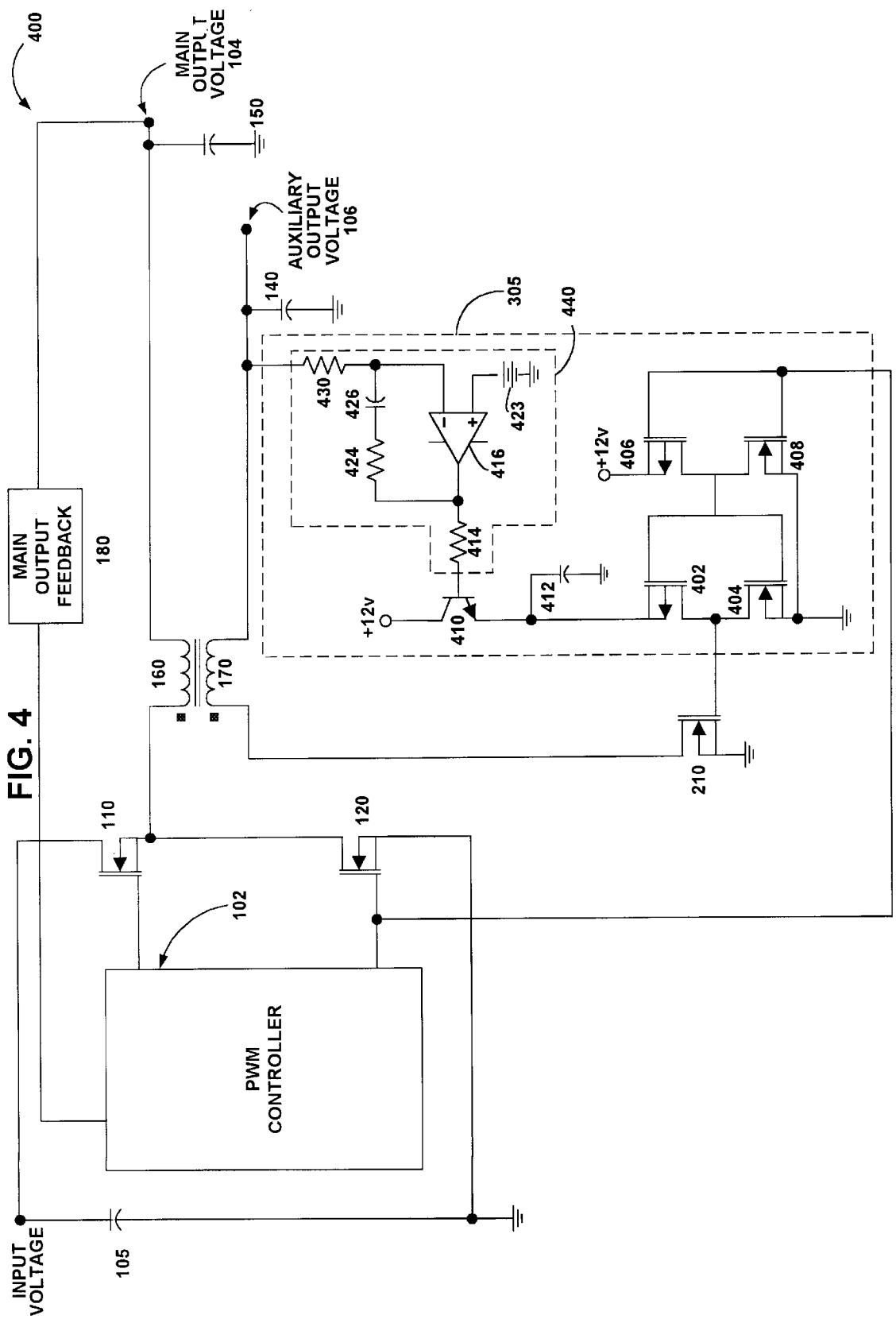
FIG. 4 is a block diagram of a buck/overwind converter showing individual components according to the principles of the invention.
Figure 5:
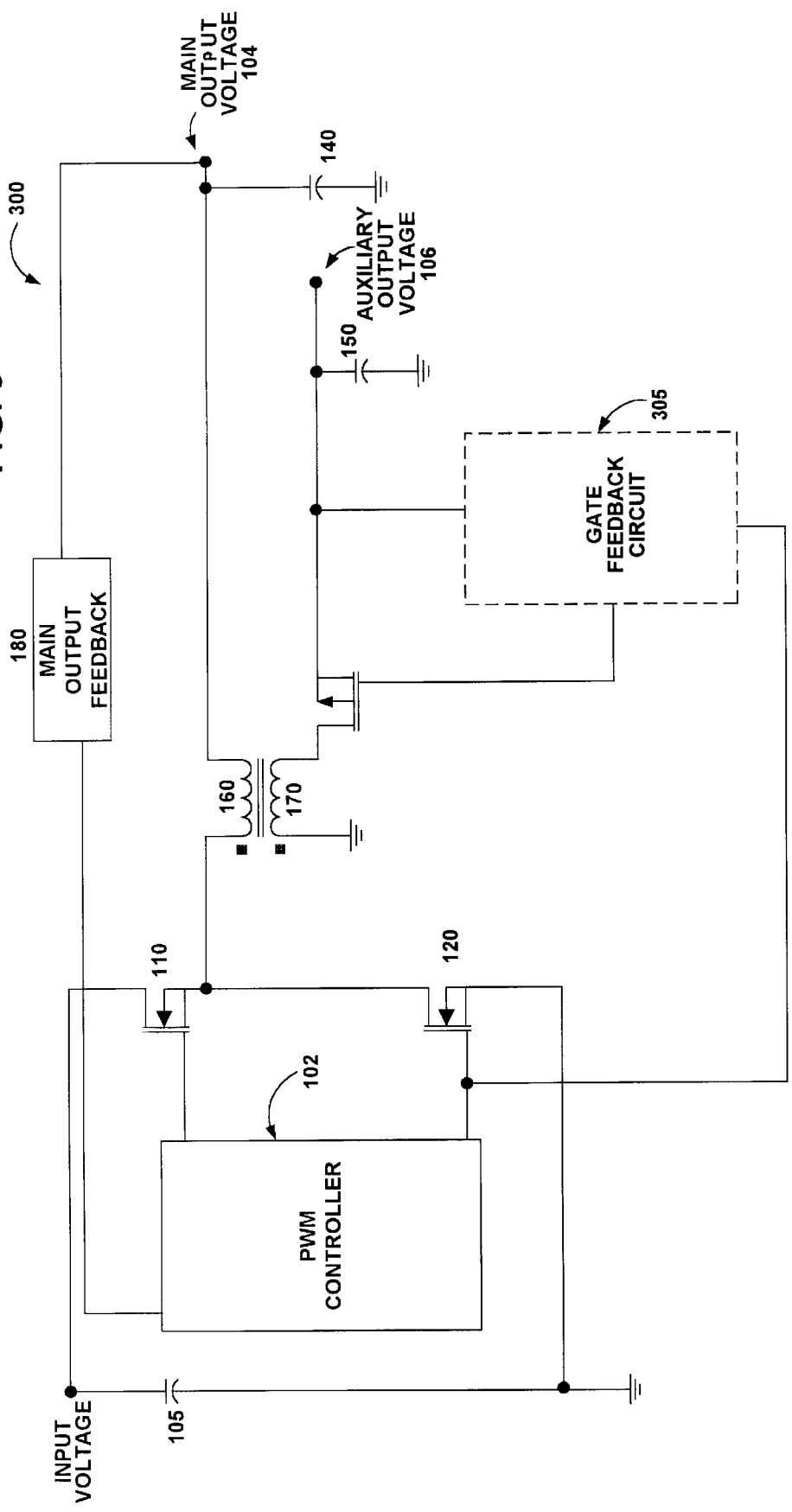
FIG. 5 is a block diagram of another buck/overwind converter according to the principles of the invention.

FIG. 4 shows individual components in one preferred embodiment of coupled-inductor buck converter 300 shown in FIG. 3. The individual components in the coupled-inductor buck converter 400 shown in FIG. 4 operate in the following way. An error detection circuit 440 comprising operational amplifier 416 in combination with resistor 430, resistor 424, resistor 414 and capacitor 426 preferably compares the auxiliary output voltage 106 to a reference voltage 423 and adjusts the base current of NPN transistor 410 as required to maintain a desired auxiliary output voltage 106. The voltage at the emitter of transistor 410 provides the drive voltage to the gate of switch 210 by passing it through the drain-source junction of transistor 402. Thus, as the amplitude of the drive voltage provided by NPN transistor 410 is varied, the amplitude of the gate drive delivered to the gate of switch 210 is also varied. The MOS inverters, including transistor 402, transistor 404, transistor 406 and transistor 408, are used to drive the gate of switch 210 in phase with the gate of switch 120.

As is well known in the art, the ON resistance of switch 210 varies inversely to its gate drive amplitude. In the present invention, a change in this gate drive amplitude causes a change at the auxiliary output voltage because there are no additional power dissipating elements in the power path of the auxiliary output loop (the auxiliary output loop runs from the auxiliary output through secondary inductor 170 and switch 210). Therefore, the efficiency of the circuit shown in FIG. 4 is always the same or better than would be obtained with a diode alone because switch 210 is always as efficient or more efficient than a diode.

The adjustment capability of the coupled-inductor buck converter 400 shown in FIG. 4 is limited to the magnitude of the forward drop of the body diode of switch 210 minus the minimum ON voltage of switch 210 at full load. As such, the concept is best applied to low auxiliary output voltage designs where the approximately 600 millivolt adjustment range is a relatively large percentage of the output voltage. At higher output voltages, the adjustment range is still the same 600 millivolts. However, the adjustment range as a percentage of the output is lower. The circuit has been found to work very well at 5 volts output, and also provided a major improvement at 12 volts output over a conventional, unregulated output.

It should be noted the MOSFET(s) in the circuit could be either N type or P type and still be configured in such a manner as to permit the circuit to operate as described above. It is also possible to configure both positive or negative outputs with appropriately designed level shift circuitry for the gate drive. Multiple outputs on one regulator are also possible by providing multiple over-windings on the main buck inductor.

In an another embodiment of the invention, a Schottky diode may be inserted in series with the MOSFET to eliminate the reverse recovery effects of the body diode of the MOSFET. The reverse recovery phenomenon can be problematic in relatively high voltage outputs (e.g., 12 volts). Because the Schottky diode has no reverse recovery characteristics, it turns off much more quickly than the relatively slow body diode of the FET and the system's performance improves. This improvement comes at the expense of a slight loss of efficiency caused by the forward conduction voltage drop across the diode.

In yet another embodiment of the invention, two MOSFETSs may be installed in series with their gates connected together in place of switch 210. This permits a larger adjustment range to be achieved.

Thus, a circuit and technique for developing a regulated auxiliary output with an over-winding on a synchronous buck regulator is provided. One skilled in the art will appreciate that the present invention can be practiced by other than the described embodiments, which are presented for purposes of illustration and not of limitation, and the present invention is limited only by the claims which follow.

What is claimed is:

1. A method for regulating an auxiliary output voltage in a switching regulator, wherein said switching regulator includes a control circuit for regulating a main output voltage, and said switching regulator includes an auxiliary power loop having a switch, said power loop for producing said auxiliary voltage, said method comprising:

generating said main output voltage;

generating said auxiliary voltage proportionally to said main voltage;

feeding back a signal from said main voltage to said control circuit; and adjusting the amplitude of a drive signal to said switch in order to modulate the ON-resistance of said switch and, thereby, regulate said auxiliary voltage.

2. The method of claim 1 wherein said switch is a MOSFET.

3. The method of claim 2 wherein said generating said main output voltage comprises generating said main output voltage with a coupled-inductor buck switching regulator.

4. The method of claim 3 wherein said generating a main output voltage further comprises generating said main output voltage using:

a first switch and a second switch coupled in series across a source of electric potential;

a first inductive element coupled at a first end to a node between said first and second switches, and coupled at a second end to produce said main voltage;

a second inductive element coupled at one end to produce said auxiliary voltage, and magnetically coupled to said first inductive element.

5. The method of claim 4 wherein said adjusting comprises using a control circuit to synchronously control a duty cycle of said first switch, a duty cycle of said second switch and a duty cycle of said MOSFET switch such that said first and second switches operate substantially out of phase with one another in order to regulate said main voltage, and said MOSFET switch operates substantially in phase with said second switch.

6. The method of claim 5 wherein said adjusting further comprises using a gate feedback circuit coupled to said auxiliary voltage, a gate of said MOSFET switch, and said control circuit, to modulate said amplitude as a function of said auxiliary voltage.

7. The method, of claim 1 wherein said generating a main voltage further comprises using a main feedback circuit coupled between said main voltage and said control circuit to govern the duty cycle of said first switch.

8. A switching regulator having a regulated main output voltage and at least one regulated auxiliary output voltage, said switching regulator comprising a field effect transistor having a gate, the gate having a gate voltage, the transistor coupled in series with said auxiliary voltage and a control circuit coupled to regulate said main voltage and the ON-time of said transistor, wherein the improvement comprises;

a gate feedback circuit coupled to said auxiliary voltage, the gate, and said control circuit, wherein said gate feedback circuit modulates the amplitude of the gate voltage, thereby varying the ON-resistance of said transistor, as a function of said auxiliary voltage in order to regulate said auxiliary voltage.

9. The switching regulator of claim 8, wherein said transistor is a MOSFET switch.

10. The switching regulator of claim 9, further comprising;

a first switch and a second switch coupled in series across a source of electric potential;

a first inductive element coupled at a first end to a node between said first and second switches, and coupled at a second end to produce said main voltage;

a second inductive element coupled at one end to produce said auxiliary voltage, and magnetically coupled to said first inductive element; and said MOSFET switch being coupled in series with said second inductive element to modulate current through said second inductive element.

11. The switching regulator of claim 10 wherein the control circuit is coupled to synchronously control a duty cycle of said first switch, a duty cycle of said second switch and a duty cycle of said MOSFET switch such that said first and second switches operate out of phase with one another in order to regulate said main voltage, and said MOSFET switch operates in phase with said second switch.

12. The switching regulator of claim 8 wherein said control circuit is a PWM controller.

13. The switching regulator of claim 10 further comprising a gate feedback circuit coupled to said auxiliary voltage, a gate of said MOSFET switch, and said control circuit, wherein said gate feedback circuit modulates the ON-resistance of said MOSFET switch as a function of said auxiliary voltage in order to regulate said auxiliary voltage.

14. The switching regulator of claim 13, wherein said gate feedback circuit comprises:

a first resistor having a first end coupled to said one end of said second inductive element;

an error amplifier having a non-inverting input coupled to a reference voltage and an inverting input coupled to an error amplifier output;

an output resistor coupled to said output of said error amplifier;

a supply voltage source; and a MOSFET gate drive circuit coupled between said output resistor, said supply voltage source, and said MOSFET switch, that is controlled by an error amplifier output signal.

15. The switching regulator of claim 13, wherein said gate feedback circuit comprises a first inverter and a second inverter coupled in series between said control circuit and said MOSFET switch.

16. The switching regulator of claim 15, wherein said first inverter comprises an N-channel MOSFET and a P-channel MOSFET such that the gate of said N-channel MOSFET is coupled to the gate of said P-channel MOSFET and to said second inverter, the drain of said N-channel MOSFET is coupled to the drain of said P-channel MOSFET, the source of said P-channel MOSFET is coupled to said one end of said second inductive element, and the source of said N-channel MOSFET is coupled to ground.

17. The switching regulator of claim 16, wherein said second inverter comprises an N-channel MOSFET and a P-channel MOSFET such that the gate of said N-channel MOSFET is coupled to the gate of said P-channel MOSFET and to said second switch, the source of said P-channel MOSFET is coupled to said supply voltage, the drain of said P-channel MOSFET is coupled to the drain of said N-channel MOSFET and to said first inverter, and the source of said N-channel MOSFET is coupled to ground.

18. The switching regulator of claim 9 wherein said MOSFET switch is an N-channel MOSFET.

19. The switching regulator of claim 9 wherein said MOSFET switch is a P-channel MOSFET.

* * * * *

UNITED STATES PATENT AND TRADEMARK OFFICE
CERTIFICATE OF CORRECTION

PATENT NO. : 6,087,817
DATED : July 11, 2000
INVENTOR(S) : Craig Varga

It is certified that error appears in the above-identified patent and that said Letters Patent is hereby corrected as shown below:

Column 2, line 50, "ON-resistance" should be -- gate voltage --.

Signed and Sealed this

Seventeenth Day of April, 2001

Attest:

NICHOLAS P. GODICI

*Attesting Officer*  *Acting Director of the United States Patent and Trademark Office*